United States Patent
Chen et al.

(10) Patent No.: US 8,365,153 B2
(45) Date of Patent: Jan. 29, 2013

(54) SERVER-BASED CODE COMPILATION

(75) Inventors: Lingjun Chen, San Diego, CA (US);
Guofang Jiao, San Diego, CA (US);
Yun Du, San Diego, CA (US); Chun Yu,
San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1147 days.

(21) Appl. No.: 11/925,476

(22) Filed: Oct. 26, 2007

(65) Prior Publication Data
US 2009/0113402 A1  Apr. 30, 2009

(51) Int. Cl.
*G06F 9/45* (2006.01)
*G06F 15/80* (2006.01)
*G06F 13/14* (2006.01)

(52) U.S. Cl. ........ 717/140; 717/146; 717/148; 345/505; 345/519

(58) Field of Classification Search .................. None
See application file for complete search history.

(56) References Cited

U.S. PATENT DOCUMENTS

| | | | | |
|---|---|---|---|---|
| 5,313,635 A * | 5/1994 | Ishizuka et al. | ............... | 717/173 |
| 5,761,512 A * | 6/1998 | Breslau et al. | ............... | 717/140 |
| 5,987,256 A * | 11/1999 | Wu et al. | ............... | 717/146 |
| 6,370,687 B1 * | 4/2002 | Shimura | ............... | 717/146 |
| 7,174,544 B2 | 2/2007 | Zee | | |
| 7,340,730 B2 * | 3/2008 | Arkwright et al. | ............... | 717/148 |
| 7,587,712 B2 * | 9/2009 | Mountain et al. | ............... | 717/148 |
| 7,650,639 B2 | 1/2010 | Kramer et al. | | |
| 7,667,709 B2 | 2/2010 | Zimmer | | |
| 7,707,563 B2 * | 4/2010 | Wei | ............... | 717/140 |
| 7,986,325 B1 * | 7/2011 | Gold et al. | ............... | 345/506 |
| 8,271,964 B2 * | 9/2012 | Zorn et al. | ............... | 717/140 |
| 2003/0005425 A1 | 1/2003 | Zee | | |
| 2003/0177480 A1 * | 9/2003 | Arkwright et al. | ............... | 717/148 |
| 2004/0143823 A1 * | 7/2004 | Wei | ............... | 717/140 |
| 2006/0098019 A1 * | 5/2006 | Tarditi et al. | ............... | 345/505 |
| 2007/0169066 A1 | 7/2007 | Nielsen | | |
| 2007/0202941 A1 * | 8/2007 | Miltenberger et al. | ......... | 463/25 |
| 2007/0211064 A1 * | 9/2007 | Buck et al. | ............... | 345/519 |

(Continued)

FOREIGN PATENT DOCUMENTS

| | | |
|---|---|---|
| JP | 5088907 A | 4/1993 |
| JP | 2000122871 A | 4/2000 |

(Continued)

OTHER PUBLICATIONS

Tehver, M. Design and Applications of a Real-Time Shading System. 2004. pp. 1-35. [retrieved on Jun. 16, 2011]. Retrieved from the Internet: <URL: http://dspace.utlib.ee/dspace/bitstream/handle/10062/610/Tehver.pdf;jsessionid=5B15FDFBC1E0BF0D2ECBB1E4EFFAF430?sequence=5>.*

(Continued)

*Primary Examiner* — Thuy Dao
*Assistant Examiner* — Geoffrey St Leger
(74) *Attorney, Agent, or Firm* — James R. Gambale, Jr.

(57) ABSTRACT

A server is disclosed that includes an interface to a data communication network, a compiler library that stores a plurality of different compilers, and compiler selection logic responsive to data received at the interface and including logic. The compiler selection logic is configured to select one of the plurality of different compilers based on an evaluation of the received data. The selected compiler generates compiled output data and the compiled output data is communicated over the data communication network to a client.

11 Claims, 9 Drawing Sheets

U.S. PATENT DOCUMENTS

| | | | |
|---|---|---|---|
| 2008/0127135 A1* | 5/2008 | Bergstrom et al. | 717/140 |
| 2011/0102443 A1 | 5/2011 | Dror et al. | |

FOREIGN PATENT DOCUMENTS

| | | |
|---|---|---|
| KR | 20030000926 A | 1/2003 |
| KR | 1020060006272 A | 1/2006 |
| WO | WO2011072971 A1 | 6/2011 |

OTHER PUBLICATIONS

McWatters, D. Nvidia Cg and CG Compiler. Jun. 13, 2002. Tweak 3D. [retrieved on Jun. 17, 2011]. Retrieved from the Internet:<URL: www.tweak3d.net/articles/nvidia/cg/>.*

Humphreys, G. and Buck, I. and Eldridge, M. and Hanrahan, P., Distributed Rendering for Scalable Displays, 2000, Proceedings of the IEEE/ACM SC2000 Conference, [retrieved on Nov. 21, 2011], Retrieved from the Internet:<URL:http://www.sc2000.org/techpapr/papers/pap.pap141.pdf>.*

Tehver, M., Design and Applications of a Real-Time Shading System, 2004, pp. 4-5 and 34-36, [retrieved on Nov. 22, 2011], Retrieved from the Internet: <URL:http://dspace.utlib.ee/dspace/bitstream/handle/10062/610/Tehver.pdf?sequence=5>.*

Lamberti, F., et al., An Accelerated Remote Graphics Architecture for PDAs, Proceedings of the eighth international conference on 3D Web technology, ACM, 2003, 7 pages, [retrieved on Nov. 18, 2011], Retrieved from the Internet: <URL:http://dl.acm.org/>.*

Banerjee, K., et al., Remote Execution for 3D Graphics on Mobile Devices, International Conference on Wireless Networks, Communications and Mobile Computing, IEEE, 2005, pp. 1154-1159, [retrieved on Sep. 18, 2012], Retrieved from the Internet: <URL:http://ieeexplore.ieee.org/>.*

International Search Report and Written Opinion—PCT/US2008/081205—ISA/EPO—Dec. 2, 2008.

European Search Report—EP08006298 Search Authority—Munich Patent Office Nov. 26, 2008.

Dowty, et al., "GPU Virtualization on VMWare's Hosted I/O Architecture", Nov. 3, 2008, found at http://static.usenix.org/event/wiov08/tech/full_papers/dowty/dowty_html/, 16 pp.

High Performance Computing (HPC), Amazon Web Services, accessed Jul. 4, 2011, found at http://aws.amazon.com/hpc-applications/, 2 pp.

Taiwan Search Report—TW097141107—TIPO—Apr. 17, 2012.

Matsubara A, "Microsoft Beleaguered by Java Enjoying Tumultuous Popularity", Nikkei Byte, Japan, Nikkei Business Publications, Inc., Mar. 22, 1996, No. 150, pp. 134-143.

* cited by examiner

SERVER-BASED CODE COMPILATION

FIELD

The present disclosure generally relates to systems and methods of server-based code compilation.

DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a portable gaming console, a digital still camera, a digital video camera, a digital recorder, and an audio file player. Also, such wireless telephones can include applications, such as web browser applications, that can be used to access the Internet. As such, these wireless telephones include significant computing capabilities.

Typically, as these devices become smaller and more powerful, they become increasingly resource constrained. For example, the screen size, the amount of available memory and file system space, and the amount of input and output capabilities may be limited by the small size of the device. Further, the battery size, the amount of power provided by the battery, and the life of the battery may also be limited.

Additionally, computing resources on a portable device are limited. For example, processor capability on a cellular phone is limited by size and power consumption constraints. As such, the compilation of programs involving the conversion of software from source code to object code is typically not performed on such portable devices. However, since portable devices have different processors and execution platforms, the compilation needs of each type of device having a different platform is different. This platform variation leads to complexity and increased costs for application developers that would prefer to develop software applications for a single target execution environment, instead of creating different versions of applications to accommodate multiple platforms. In addition, the issues related to applications for different target platforms have become more significant with the proliferation of various portable devices having increased functionality, such as video and multimedia application processing capability.

Accordingly, it would be advantageous to provide an improved system and method of compilation.

SUMMARY

A server-based compilation method and a server for implementing the method are disclosed. The server-based compilation method includes receiving a code compilation request at a server having a plurality of compilers. The method also includes comparing information in the code compilation request to a list of the plurality of compilers stored at the server to determine if the server has a compiler suitable to compile source code associated with the code compilation request; and communicating a response to the code compilation request from the server to a client over a network. The response includes an indication of an acceptance or a denial of the code compilation request. When the response includes an indication of an acceptance of the code compilation request, the method includes receiving source code to be compiled at the server, compiling the received source code at the server using the selected compiler that is suitable to compile the source code to generate compiled code, and communicating the compiled code from the server to the client via the network.

In a particular embodiment, the server includes an interface to a data communication network, a compiler library that stores a plurality of different compilers, and compiler selection logic responsive to data received at the interface. The compiler selection logic includes logic to select one of the plurality of different compilers based on an evaluation of the received data. The selected compiler is used to generate compiled output data and the compiled output data is communicated via the data communication network to a client.

In still another embodiment, a method of requesting server-based code compilation from a client is disclosed. The method includes sending a code compilation request to a server having a plurality of compilers, receiving a response to the code compilation request from the server, the response indicating either an acceptance or a denial of the code compilation request, upon detecting an acceptance of the code compilation request, sending source code to the server, the source code to be compiled at the server, receiving compiled code from the server after the server has compiled the source code.

In yet another embodiment, a computing device is disclosed. The computing device includes a processor, a memory accessible to the processor, and a communication interface. The communication interface is configured to send a code compilation request to a server having a plurality of compilers and to receive a response to the code compilation request from the server. The response indicates either an acceptance or a denial of the code compilation request. The communication interface is further configured to send source code to the server to be compiled at the server, and to receive compiled code from the server.

An advantage of one or more of the embodiments disclosed herein can include conservation of device resources by shifting the compilation of software application code to a server that may have greater processing resources. Another advantage of one or more embodiments disclosed herein can include the distribution of software for execution at an application processing unit, such as a graphics processing unit, video processing unit or camera image processing unit of a client device without requiring user interaction or user selection of the software based on compatibility with the application processing unit.

Another particular advantage of the one or more embodiments can include simplification of the software coding process, by allowing an application developer to write code addressed to a desired platform and by providing a server-based code compilation system that can compile the code to one or more specific device platforms in response to receiving a request from a portable device. In this manner, code written to a single platform may be compiled for use on multiple devices that operate on different platforms, without increasing complexity for the software developer and without consuming processing resources at the portable device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the advantages of the embodiments described herein will become more readily apparent by reference to the following detailed description when taken in conjunction with the accompanying drawings wherein.

DETAILED DESCRIPTION

Figure 1:
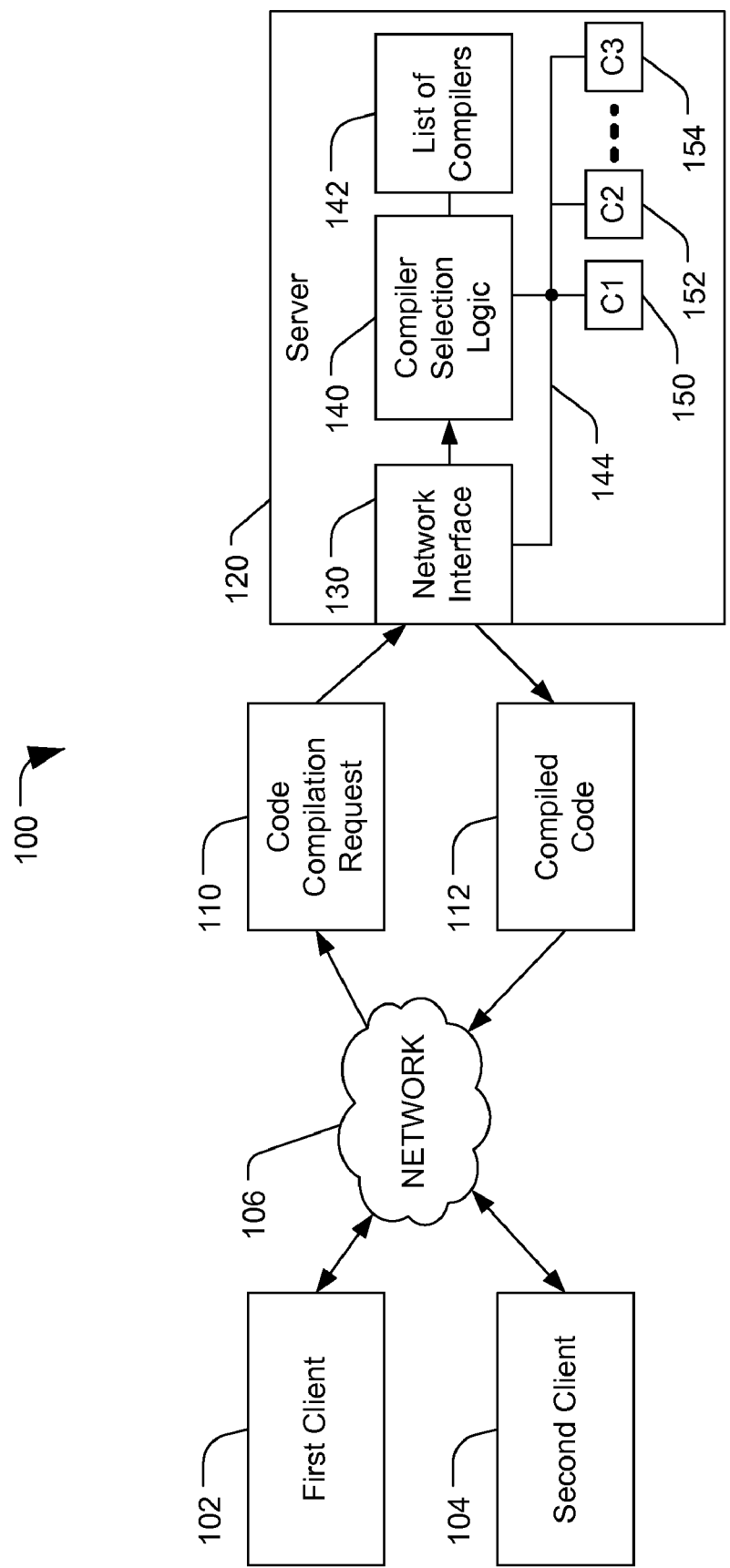
FIG. 1 is a block diagram of an exemplary system that includes a server to perform server-based compilation.

FIG. 1 illustrates a block diagram of an exemplary system that includes a server to perform server-based compilation. The system 100 includes representative clients 102, 104, a data network 106, and a server 120. The server 120 includes a network interface 130, compiler selection logic 140, a list of supported and stored compilers 142, and a compiler library that includes a plurality of compilers 150, 152, 154. The plurality of compilers 150, 152, and 154 are coupled to the network interface 130 and to the compiler selection logic 140. The network interface 130 is coupled to the data communication network 106. The data communication network 106 may be an Internet Protocol network and may be a wireline or a wireless data network. In general, the compilers 150, 152 and 154 are adapted to translate bytecode, symbolic code or high-level symbolic language into equivalent processor readable instructions that a particular processor can understand and execute. In a particular embodiment, the compiled result may be an intermediate representation language code or bytecode, for example, assembly code of X86 type of processors. The intermediate representation may be flexible and portable for many platforms or processing units. The intermediate representation language code may be used as input to another (lower) level compiler for a specific platform or processing unit. Each of the compilers stored at the server 120, such as the illustrated compilers 150, 152, and 154, are different compilers that are used to compile code for different processors. For example, the first client 102 and the second client 104 may have different processors that utilize different execution platforms. The server 120 is adapted to receive a compilation request, select an appropriate compiler from the available compilers 150, 152, and 154, and compile code for the requesting device, such as the first client 102, using the selected compiler that is appropriate for the particular processor associate with the first client 102.

The compiler selection logic 140 is responsive to data received at the network interface 130, such as the code compilation request 110 received from one of the clients 102, 104. The compiler selection logic 140 includes logic to select one of the plurality of different compilers 150, 152, or 154 based on an evaluation of the received data, such as an evaluation of information communicated in the code compilation request message 110. In a particular embodiment, the compiler selection logic 140 may be implemented as a logic circuit. During operation, the compiler selection logic 140 determines a selected compiler (e.g., compiler 150) from the compiler library and communicates a message to the requesting client (e.g., the first client 102). The message to the requesting client indicates either an acceptance or a denial to the code compilation request message 110.

When a suitable compiler is available at the server 120, the server 120 communicates an acceptance to the code compilation request message 110. In response, the requesting client 102 or 104 can send source code to be compiled to the server 120, and the compiler selection logic 140 at the server 120 routes the received source code to the selected compiler 150, 152, or 154. The selected compiler 150, 152, or 154 compiles the source code and generates compiled code 112. The compiled code 112, also referred to as object code, is communicated to the requesting client 102 or 104 via the network interface 130 and the network 106.

In a particular embodiment, the requesting client 102 or 104 may be a personal computer, a portable computer, a hand-held computing device, such as wireless phone, a personal digital assistant, a media playback device, or a similar device. The requesting client device may include a target application processing unit, such as a graphics processing unit (GPU) to execute the compiled code sent from the server 120. The requesting client 102 or 104 may also be a software application, a driver, an installation program, other processor executable instructions, or any combination thereof. The code compilation request 110 may include information about the target application processing unit so that the server 120 can select an appropriate compiler. In a particular embodiment, the information includes a source code language name, a source code language version, a processing unit name, a processing unit version, or any combination thereof.

In a wireless application, the server 120 may be disposed within or co-located at a wireless base station of a wireless communication network. In another particular embodiment, the server 120 may communicate with a wireless base station of a wireless communication network. In an application where the server 120 includes shader compilers for various GPU platforms, a typical source code file size or compiled file size to be transmitted may be small, such as less than 2,000 bytes. Thus, transmission of source code via a wireless communication network, compilation at the server 120, and receipt by the requesting client 102 or 104 may occur at runtime without introducing unacceptable delays.

In a particular embodiment, a client 102 or 104 may include a general central processing unit (CPU), digital signal processor (DSP) one or more application processing units, or any combinations thereof. The application processing units may include a graphics processing unit, a video processing unit, a camera image processing unit, other application processing units, or any combination thereof. An application program may include multiple layers, such as an application layer having code based on one or more application programming interfaces, such as Open GL®, DirectX® etc, a driver layer under the programming interfaces, and an application processing layer that may be executed on one or more dedicated application processing units, on a DSP, or on a CPU. In a particular embodiment, according to a specific configuration, some components of application processing layer may be executed on dedicated application processing units, other components may be executed on a DSP, and still other components may be executed on a CPU. In a particular embodiment, a client such as an installer, application, or driver running on a CPU of the client 102 or 104 may issue different compilation requests to the server 120 for different components for a single application program. For example, the client 102 or 104 may generate requests to compile code into CPU executable code for some components, requests to compile source code into DSP executable code for other components, and requests to compile source code into machine code executable by specific application processing units for specific components. The client may distribute compiled codes received from the server 120 for execution on a corresponding application processing unit, DSP, CPU, or any combination thereof. In a particular embodiment, a CPU or DSP may function as one or more application processing units when such application processing units are not dedicated and availably configured in the client device.

In a particular embodiment, the server 120 may receive shading language source code and may compile the source code for execution at a GPU. In other embodiments, the server 120 may be adapted to compile other types of source code for other processing platforms. For example, the server 120 may compile digital signal processor (DSP) code written in C or another programming language and may output DSP-executable code. As another example, the server 120 may receive shading language code and may output DSP-executable code, in a case where at least a portion of a computing task is moved from a GPU to a DSP. As another example, the server 120 may receive shading language code, and may output Advanced Reduced Instruction Set Computing (RISC) Machine (e.g., ARM) code. In another example, the server 120 may receive C-language source code and may output GPU-executable code, such as for general-purpose computation at a GPU. For example, the GPU may be used to perform general purpose audio or video processing that is moved from a CPU or DSP to the GPU. Other embodiments may include the server 120 receiving C code and outputting either CPU-executable code or DSP-executable code, according to specific hardware configurations.

Figure 2:
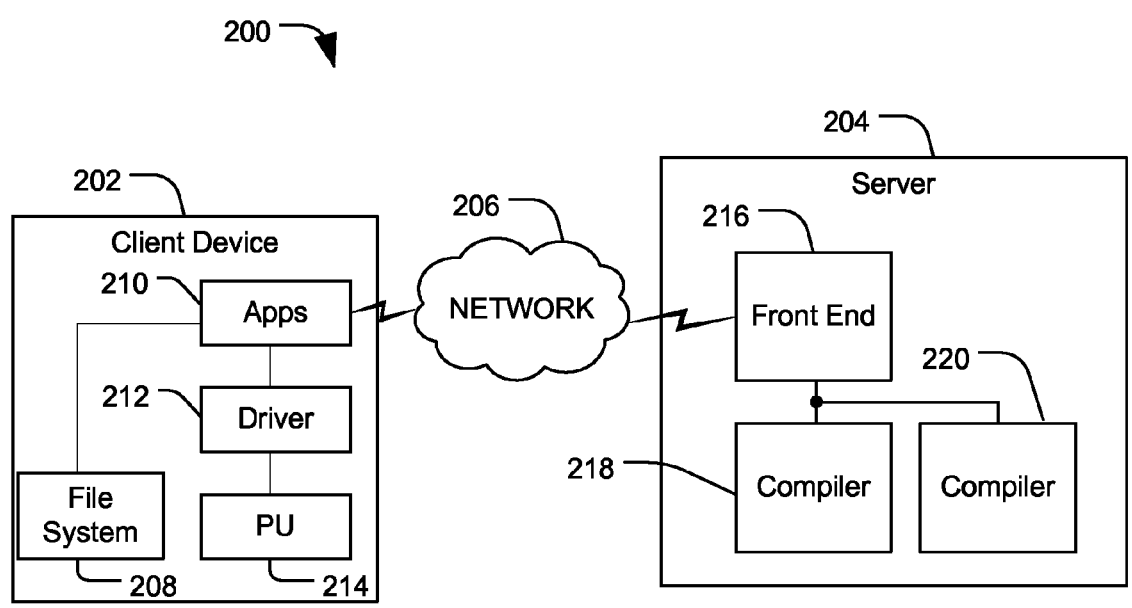
FIG. 2 is a block diagram of an embodiment of a system that utilizes server-based compilation.

FIG. 2 illustrates a block diagram of an embodiment of a system 200 that utilizes server-based compilation. The system 200 includes a client device 202 that communicates with a server 204 via a network 206. In a particular embodiment, the network 206 may include a wireless network, a wireline network, or any combination thereof. The client device 202 includes a file system 208 that can be used to organize data in directories and files at a memory (not shown) of the client device 202. The client device 202 also includes one or more applications 210, a driver 212, and an application processing unit 214. In a particular embodiment, the application processing unit 214 may include a graphics processing unit (GPU), a video processor, a camera or imaging processor, an audio processor, another application-specific processor, or any combination thereof. In a particular embodiment, the client device 202 may include a CPU (not shown), a DSP (not shown), or any combination thereof. The CPU, DSP and application processing unit 214 have access to the memory, the applications 210 and the driver 212. The CPU may execute the applications 210 to communicate with the server 204 via the network 206. The server 204 includes a front end 216, a first compiler 218 and a second compiler 220. The front end 216 can include compiler selection logic, such as the compiler selection logic 140 illustrated in FIG. 1.

In a particular illustrative embodiment, the client device 202 may execute at least one of the one or more applications 210 to retrieve source code or intermediate representation bytecode stored in the memory via the file system 208. A processor such as a central processing unit (CPU) may execute the one or more applications 210 and may generate a code compilation request that is related to the source code. The code compilation request can include a code language identifier (such as shader programming language name, e.g., OpenGL Shading Language (GLSL), High Level Shading Language (HLSL), Cg, etc., a high level programming language name, e.g., JAVA®, C++, or other programming language identifiers), a version identifier, a target name (e.g., a GPU name or a CPU name), a target version, a supported binary code name, and a version identifier. The client device 202 attempts to establish a connection to the server 204 via the network 206. If the connection is established, the client device 202 can send the code compilation request to the server 204 via the network 206 to determine whether the server 204 has the ability to compile the code. The client device 202 receives a response from the server 204. The response may be an acceptance indicating that the server 204 can compile the code. Alternatively, the response may include a denial of the request. If the response indicates an acceptance by the server 204, the client device 202 sends the code to the server 204 via the network 206 and waits for a compiled result. When the client device 202 receives the compiled result, the client device 202 may execute the compiled result.

In a particular example, a particular application 210 executed at the client device 202 (i.e., a client) may initiate communication with the server 204. For example, at a particular point in the execution, the application 210 may require execution of the source code or intermediate representation bytecode. The application 210 may initiate a request for compilation of the code to the server 204. In response to receiving a response indicating an acceptance, the application 210 may send the code to the server 204 for compiling. The application 210 may receive the compiled code. After the application 210 receives the compiled result, the application 210 either stores the result at the local file system 208 (i.e., at the memory), provides the compiled result to the driver 212, to the application processing unit 214, or any combination thereof. In a particular illustrative embodiment, the application 210 may check the compiled result and load the compiled result the next time the application 210 is executed. In another particular illustrative embodiment, the application 210 may pause execution, request compilation of the code on the fly, receive the compiled code, and resume execution using the compiled code. In still another particular illustrative embodiment, a client may request a particular application from the server 204, which compiles the requested application according to the request, and provides the compiled code to the client for storage, execution, or any combination thereof.

Figure 3:
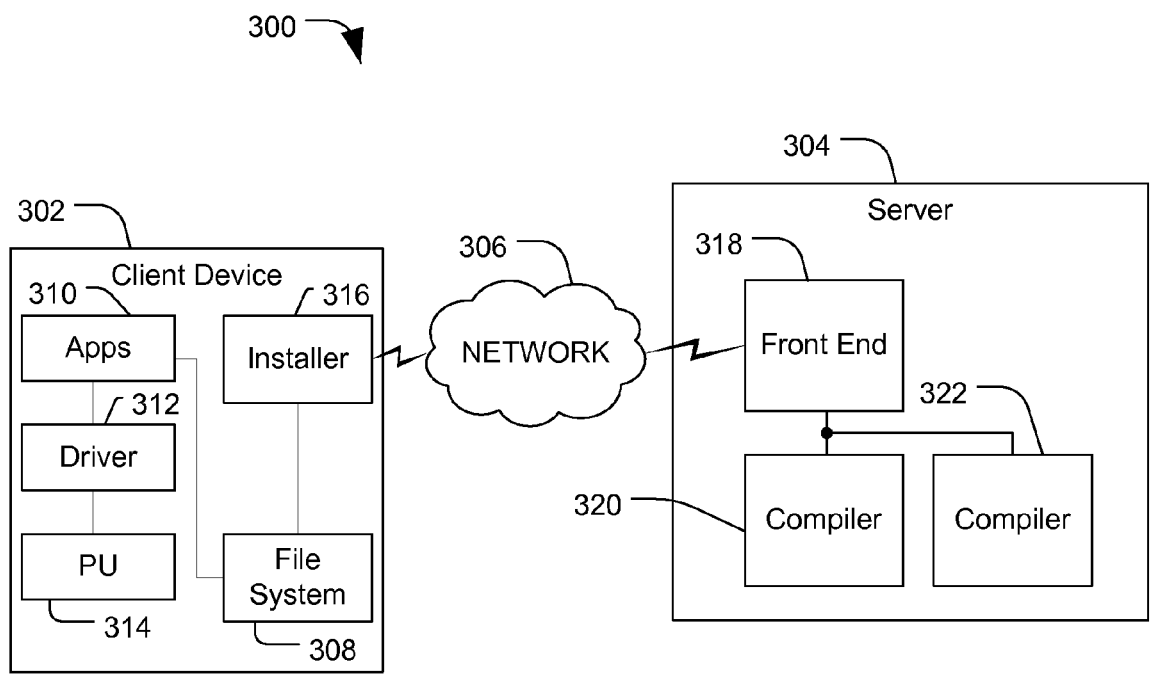
FIG. 3 is a block diagram of another embodiment of a system that utilizes server-based compilation.

FIG. 3 illustrates a block diagram of another particular embodiment of a system 300 that utilizes server-based compilation. The system 300 includes a client device 302 that communicates with a server 304 via a network 306. In a particular embodiment, the network 306 may include a wireless network, a wireline network, or any combination thereof. The client device 302 includes a file system 308 that can be used to organize data in directories and files at a memory (not shown) of the client device 302. The client device 302 also includes one or more applications 310, a driver 312, an application processing unit 314, and an installer (downloader) 316. In a particular embodiment, the application processing unit 314 may include a graphics processing unit (GPU), a video processing unit, a camera or image processing unit, an audio processing unit, another application-specific processing unit, or any combination thereof. In a particular embodiment, the client device 302 may include a CPU (not shown), a DSP (not shown), or any combination thereof. In a particular illustrative embodiment, each of the CPU, DSP and application processing unit 314 has access to the memory, the one or more applications 310, and the driver 312, and the CPU executes at least one of the one or more applications 310. In a particular embodiment, the installer 316 may be a software application that is executable to communicate with the server 304 via the network 306 to download compiled code. The server 304 includes a front end 318, a first compiler 320 and a second compiler 322. The front end 318 can include compiler selection logic, such as the compiler selection logic 140 illustrated in FIG. 1.

In a particular illustrative embodiment, the installer 316 may initiate communication with the server 304. When installing software, the installer 316 collects data on behalf of an application of the one or more applications 310 and sends a request for compilation services to the server 304. The installer 316 receives compiled code from the server 304 and stores the compiled code at the local file system 308. One of the one or more applications 310 may read the compiled (binary) code and format from the local file system 308 and can send the compiled code directly to the driver 312. In another particular embodiment, when an application is downloaded from another server (not shown), the installer (downloader) 316 may instruct the server from which the application is downloaded to send a compilation request to the server 304, to send compiled code directly to the client device 302. In another particular embodiment, when an application is downloaded from an application server (not shown), the installer (downloader) 316 may provide compilation information to the application server, and the application server may send a compilation request to the server 304. The server 304 may return compiled binary code to the application server, which may pack the application and the binary code together to send to the client device 302. By routing the request to the server 304 via the application server, the compilation and the installation may be transparent to the client device 302.

In a particular embodiment, the client device 302 may be an online gaming device, and the application downloading may occur while the application is running at the client device and advancing in relation to player interaction. The downloading may demand compilation services of the server 304 via the network 306 when corresponding program portions of the application being downloaded require compiling from source code to machine code that is executable by one or more processing units at the client device 302. In this case, the downloading server or application server may directly initiate compilation requests to the server 304 and receive compiled codes from the server 304 at the application server. The application server may send the compiled codes to the client device 302 for execution. The compiled codes downloaded from application server may be downloaded together with associated other application codes and data or files that the application may require for execution. In a particular illustrative embodiment, the server 304 allows a software developer to code a particular application without concern for the platform on which the application will be executed, because the server 304 is configured to determine a platform of a requesting client and to select a compiler that is suitable to compile the source code into object code that is executable by a platform associated with the requesting client.

Figure 4:
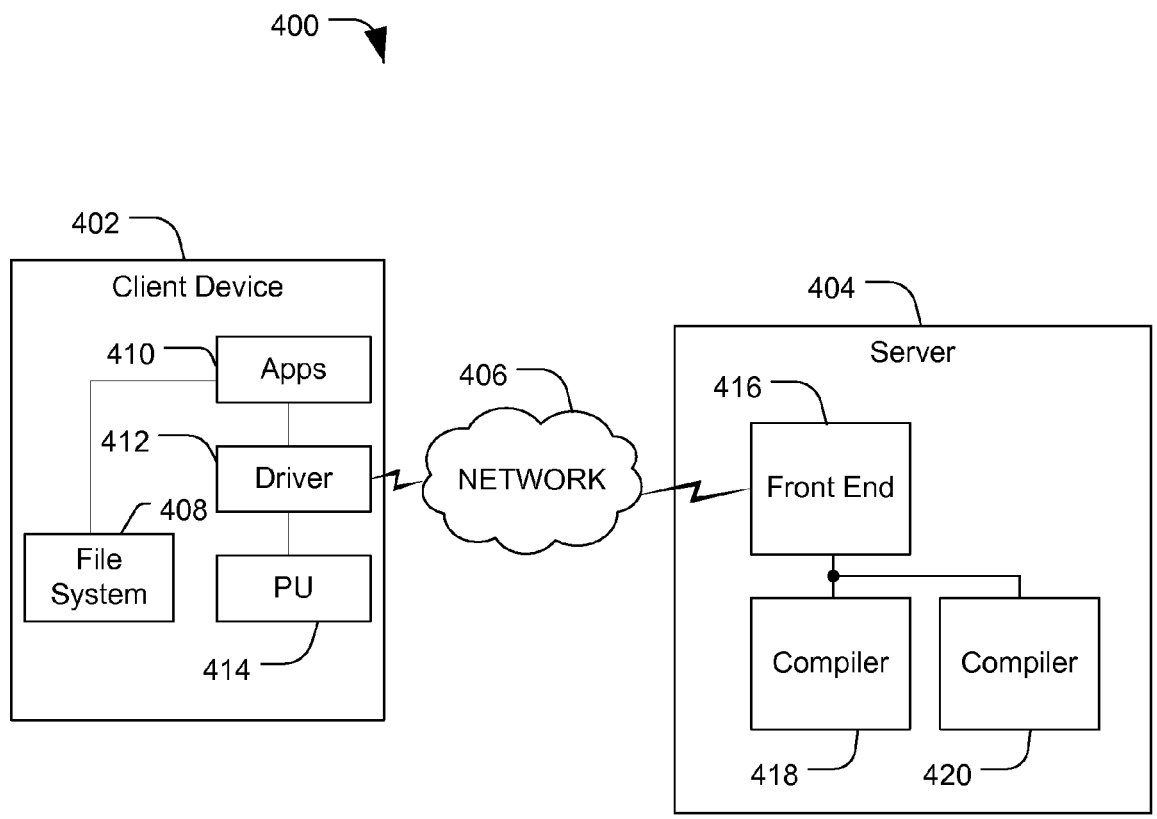
FIG. 4 is a block diagram of another embodiment of a system that utilizes server-based compilation.

FIG. 4 illustrates a block diagram of another particular embodiment of a system 400 that utilizes server-based compilation. The system 400 includes a client device 402 that communicates with a server 404 via a network 406. In a particular embodiment, the network 406 may include a wireless network, a wireline network, or any combination thereof. The client device 402 includes a file system 408 that can be used to organize data in directories and files at a memory (not shown) of the client device 402. The client device 402 also includes one or more applications 410, a driver 412, and an application processing unit 414. In a particular embodiment, the application processing unit 414 may include a graphics processing unit (GPU), a video processor, a camera or imaging processor, an audio processor, another application-specific processor, or any combination thereof. In a particular embodiment, the client device 402 may include a CPU (not shown), a DSP (not shown), or any combination thereof. The CPU or DSP may perform functions of one or more application processing units when such application processing units are not dedicated and availably configured in the client device. In a particular illustrative embodiment, the CPU, DSP and application processing unit 414 have access to the memory, the one or more applications 410 and the driver 412. In a particular embodiment, the driver 412 may be a software application that is executable to communicate with the server 404 via the network 406 to request source code compilation, to download compiled code, or any combination thereof. The server 404 includes a front end 416, a first compiler 418 and a second compiler 420. The front end 416 can include compiler selection logic, such as the compiler selection logic 140 illustrated in FIG. 1.

In a particular illustrative embodiment, the driver 412 initiates communication with the server 404 when an application 410 requests compiled source code. The server 404 may be a shader compiling server that is configured to compile shader programs to render graphics effects and to calculate a color associated with a graphical element.

In a particular illustrative embodiment, the driver 412 may receive compiled code from the server 404 and may expose the compiled code to the application 410. The application 410 may read the compiled result and store the compiled result in the local file system 408. The application 410 may then load the compiled code from the local file system 408 during subsequent executions of the application 410. In an illustrative embodiment, the source code may only be compiled at the server 404 during a first execution of the application 410 at the client device 402.

In another particular illustrative embodiment, the driver 412 may not expose the compiled code to the application 410. The application 410 may request compilation of the source code from the driver 412 each time the application 410 is executed. The application 410 may request the compiled code at runtime as if the driver was adapted to perform runtime compilation, without the application 410 having any knowledge of the server 404. In a particular illustrative embodiment, the driver 412 may send compiling requests directly to the server 404 on the fly and may cache the compiled code as needed. The server 404 can thus function as an extension of the driver 412. While waiting to receive compiled code from the server 404, the driver 412 can continue to perform operations that may be executed in parallel with the compilation.

In a particular embodiment, the application processing unit 414 may include a GPU that loads vertex and texture shading data while waiting for compiled code from the server 404. One particular advantage provided by this implementation may be realized in that, by using the driver 412 to request and receive compiled code from the server 404 transparently, loading speed of the graphics for an application 410 may be improved as compared to a system where the compiling and the loading of vertex/texture data are performed sequentially. Additionally, the server 404 may be used to provide on-demand compiling, for example, when game play levels are advanced. The client device 402 may send compilation requests to the server 404 via the network 406 only for specific gaming levels or specific details. Thus, time and storage may be saved.

Figure 5:
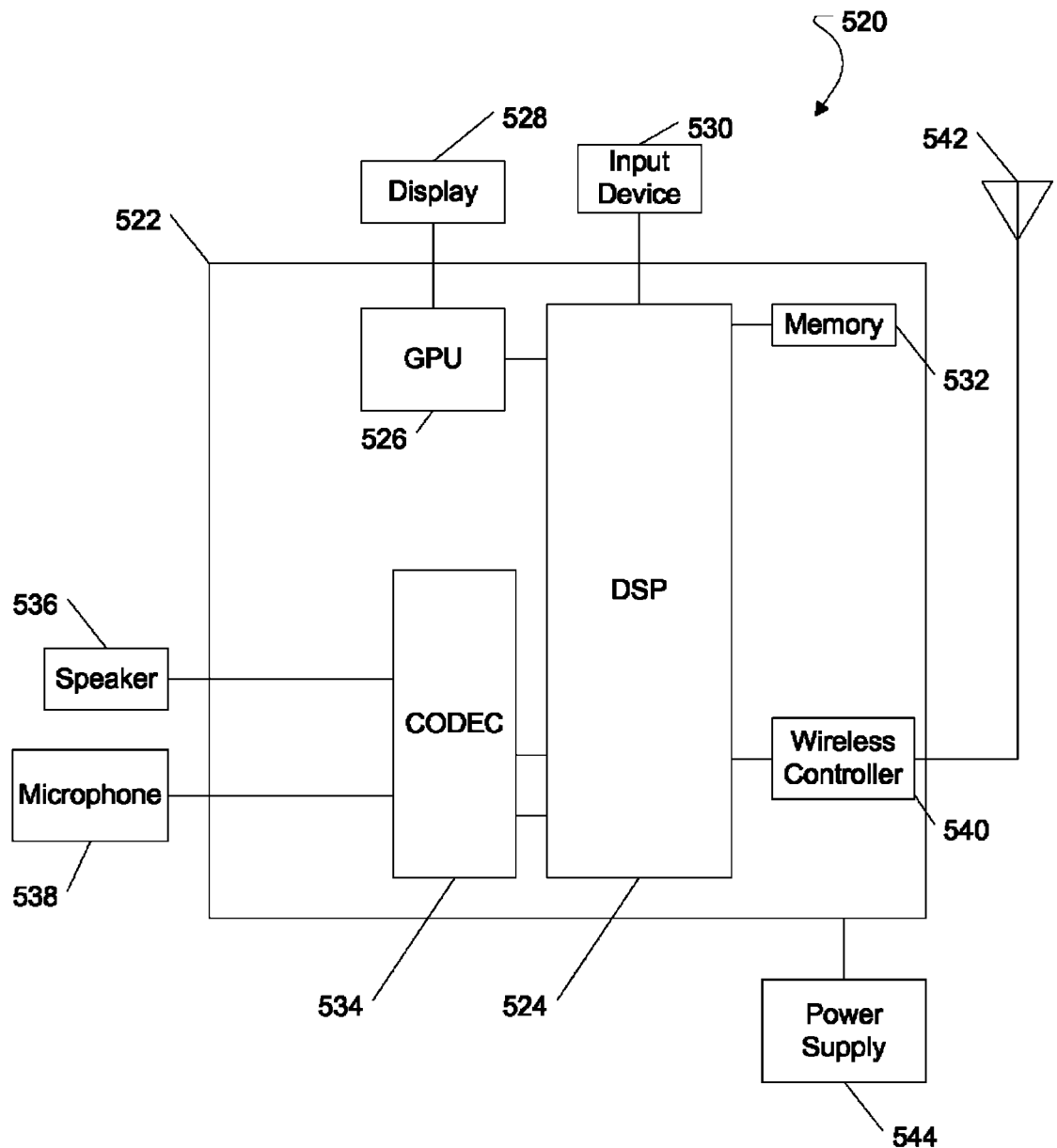
FIG. 5 is a block diagram of a portable communication device incorporating a processor to execute server compiled code.

FIG. 5 illustrates an exemplary, non-limiting embodiment of a portable communication device that is generally designated 520. As illustrated in FIG. 5, the portable communication device includes an on-chip system 522 that includes a CPU (not shown), a digital signal processor 524 and a graphics processing unit (GPU) 526. In a particular embodiment, the CPU may be configured to initiate an interaction with a compiler server, such as the server 120 illustrated in FIG. 1 and described herein, to receive compiled code for execution. FIG. 5 also shows that the GPU 526 is coupled to the digital signal processor 524 and a display 528. An input device 530 and a memory 532 are also coupled to the digital signal processor 524. Additionally, a coder/decoder (CODEC) 534 can be coupled to the digital signal processor 524. A speaker 536 and a microphone 538 can be coupled to the CODEC 534.

FIG. 5 also indicates that a wireless controller 540 can be coupled to the digital signal processor 524 and a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

In a particular embodiment, the digital signal processor 524 utilizes interleaved multithreading to process instructions associated with program threads necessary to perform the functionality and operations needed by the various components of the portable communication device 520. For example, when a wireless communication session is established via the wireless antenna a user can speak into the microphone 538. Electronic signals representing the user's voice can be sent to the CODEC 534 to be encoded. The digital signal processor 524 can perform data processing for the CODEC 534 to encode the electronic signals from the microphone. Further, incoming signals received via the wireless antenna 542 can be sent to the CODEC 534 by the wireless controller 540 to be decoded and sent to the speaker 536. The digital signal processor 524 can also perform the data processing for the CODEC 534 when decoding the signal received via the wireless antenna 542.

Further, before, during, or after the wireless communication session, the digital signal processor 524 can process inputs that are received from the input device 530. For example, during the wireless communication session, a user may be using the input device 530 and the display 528 to surf the Internet via a web browser that is embedded within the memory 532 of the portable communication device 520. The digital signal processor 524 can interleave various program threads that are used by the input device 530, the GPU 526, the display 528, the CODEC 534 and the wireless controller 540, as described herein, to efficiently control the operation of the portable communication device 520 and the various components therein. Many of the instructions associated with the various program threads are executed concurrently during one or more clock cycles. As such, the power and energy consumption due to wasted clock cycles is substantially decreased.

Figure 6:
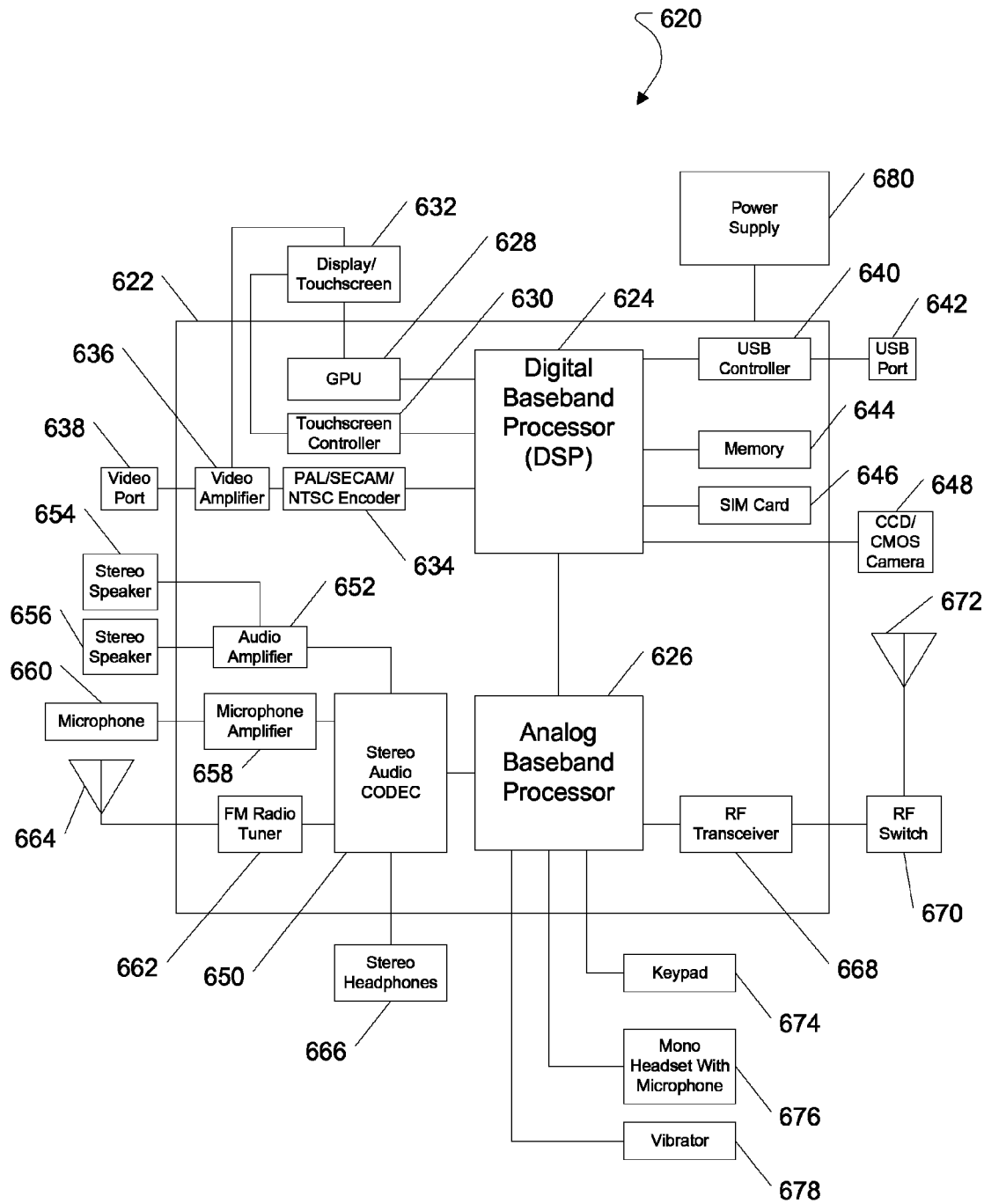
FIG. 6 is a block diagram of an exemplary cellular telephone incorporating a processor to execute server compiled code.

Referring to FIG. 6, an exemplary, non-limiting embodiment of a cellular telephone is shown and is generally designated 620. As shown, the cellular telephone 620 includes an on-chip system 622 that includes a digital baseband processor 624 and an analog baseband processor 626 that are coupled together. The cellular telephone 620 also includes a CPU (not shown) and a graphics processing unit (GPU) 628. In a particular illustrative embodiment, the CPU may be configured to initiate an interaction with a compiler server, such as the server 120 illustrated in FIG. 1 and described herein, to receive compiled code for execution. In a particular embodiment, the digital baseband processor 624 is a digital signal processor. As indicated in FIG. 6, a GPU 628 and a touchscreen controller 630 are coupled to the digital baseband processor 624. In turn, a touchscreen display 632 external to the on-chip system 622 is coupled to the GPU 628 and the touchscreen controller 630.

FIG. 6 further indicates that a video encoder 634, e.g., a phase alternating line (PAL) encoder, a sequential couleur a memoire (SECAM) encoder, or a national television system(s) committee (NTSC) encoder, is coupled to the digital baseband processor 624. Further, a video amplifier 636 is coupled to the video encoder 634 and the touch screen display 632. Also, a video port 638 is coupled to the video amplifier 636. As depicted in FIG. 6, a universal serial bus (USB) controller 640 is coupled to the digital baseband processor 624. Also, a USB port 642 is coupled to the USB controller 640. A memory 644 and a subscriber identity module (SIM) card 646 can also be coupled to the digital baseband processor 624. Further, as shown in FIG. 6, a digital camera 648 can be coupled to the digital baseband processor 624. In an exemplary embodiment, the digital camera 648 is a charge-coupled device (CCD) camera or a complementary metal-oxide semiconductor (CMOS) camera.

As further illustrated in FIG. 6, a stereo audio CODEC 650 can be coupled to the analog baseband processor 626. Moreover, an audio amplifier 652 can coupled to the stereo audio CODEC 650. In an exemplary embodiment, a first stereo speaker 654 and a second stereo speaker 656 are coupled to the audio amplifier 652. FIG. 6 shows that a microphone amplifier 658 can be also coupled to the stereo audio CODEC 650. Additionally, a microphone 660 can be coupled to the microphone amplifier 658. In a particular embodiment, a frequency modulation (FM) radio tuner 662 can be coupled to the stereo audio CODEC 650. Also, an FM antenna 664 is coupled to the FM radio tuner 662. Further, stereo headphones 666 can be coupled to the stereo audio CODEC 650.

FIG. 6 further indicates that a radio frequency (RF) transceiver 668 can be coupled to the analog baseband processor 626. An RF switch 670 can be coupled to the RF transceiver 668 and an RF antenna 672. As shown in FIG. 6, a keypad 674 can be coupled to the analog baseband processor 626. Also, a mono headset with a microphone 676 can be coupled to the analog baseband processor 626. Further, a vibrator device 678 can be coupled to the analog baseband processor 626. FIG. 6 also shows that a power supply 680 can be coupled to the on-chip system 622. In a particular embodiment, the power supply 680 is a direct current (DC) power supply that provides power to the various components of the cellular telephone 620 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 6, the touchscreen display 632, the video port 638, the USB port 642, the camera 648, the first stereo speaker 654, the second stereo speaker 656, the microphone, the FM antenna 664, the stereo headphones 666, the RF switch 670, the RF antenna 672, the keypad 674, the mono headset 676, the vibrator 678, and the power supply 680 are external to the on-chip system 622. Moreover, in a particular embodiment, the digital baseband processor 624 can use interleaved multithreading, described herein, in order to process the various program threads associated with one or more of the different components associated with the cellular telephone 620.

In a particular embodiment, the cellular telephone 620 may be configured to initiate different compilation requests to a compiler server via a network to request different compilations for different program components of applications running on the device. For example, for computing tasks of program components that are assigned to be executed at the GPU 628, a shader compiler may be selected at the compiler server. As another example, for computing tasks of program components that are assigned to a video CODEC, encoder, or decoder (not shown), a corresponding video compiler may be selected at the compiler server. As still another example, for computing tasks of program components that are assigned to the audio CODEC 650, a corresponding audio compiler may be selected at the compiler server. As yet another example, for computing tasks of program components that are assigned to be executed at the DSP 624, a DSP compiler may be selected at the compiler server. The compiled codes may be received at the cellular telephone 620 and distributed to one or more corresponding processing units for execution.

Figure 7:
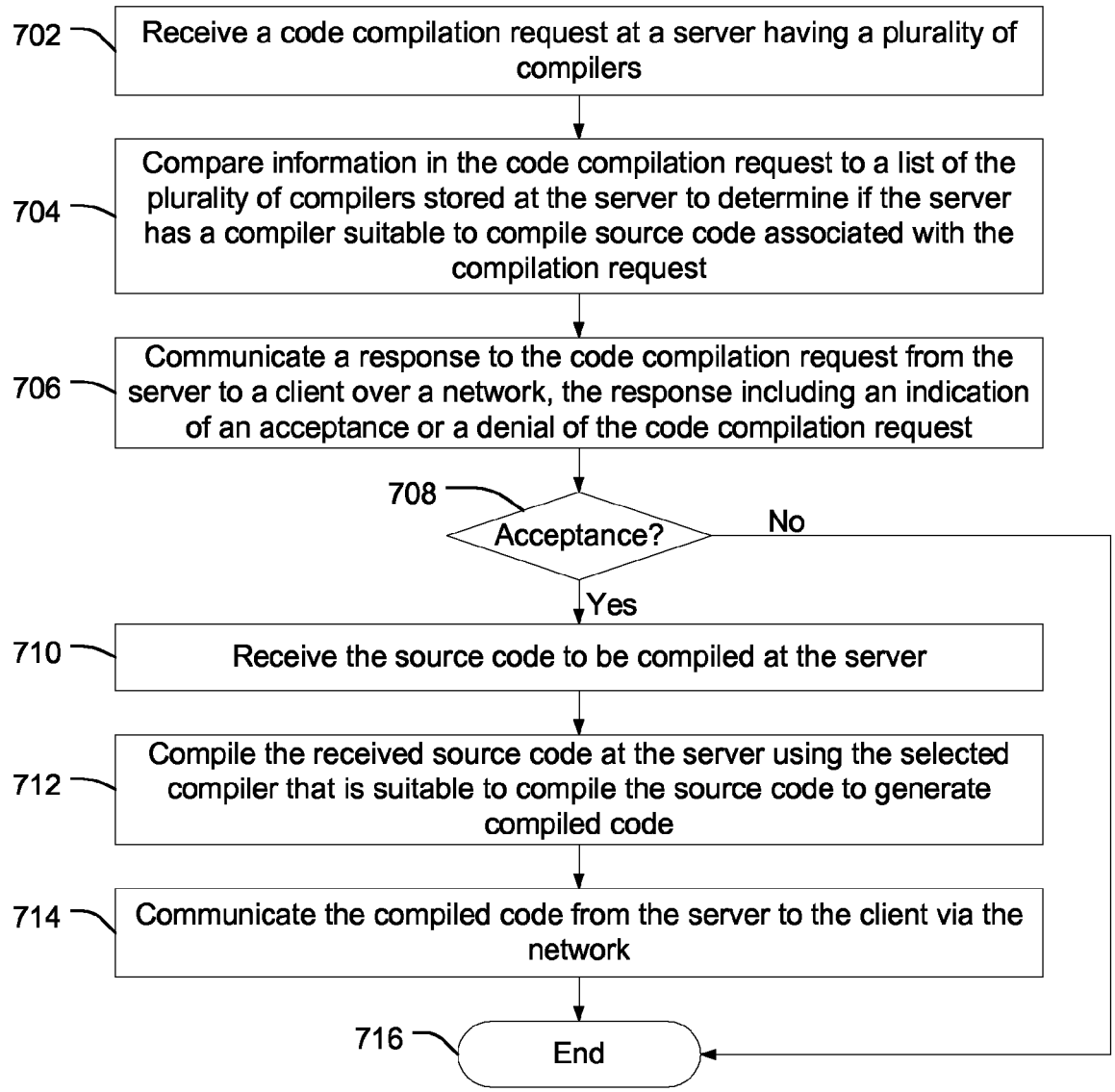
FIG. 7 is a flow diagram of a particular illustrative embodiment of a method of performing server-based compilation.

FIG. 7 is a flow diagram that illustrates a particular illustrative embodiment of a method of performing server-based compilation. Referring to FIG. 7, the server-based compilation method includes receiving a code compilation request at a server having a plurality of compilers, at 702, and comparing information in the code compilation request to a list of the plurality of compilers stored at the server to determine if the server has a compiler suitable to compile source code associated with the code compilation request, at 704. The method further includes communicating a response to the code compilation request from the server to a client via a network, the response including an indication of an acceptance or a denial of the code compilation request, at 706.

Advancing to decision node 708, when the response indicates a denial, the method terminates, at 716. Returning to 708, when the response indicates an acceptance of the code compilation request, the method continues to 710 and includes receiving source code to be compiled at the server. Proceeding to 712, the method also includes compiling the received source code at the server using the selected compiler that is suitable to compile the source code to generate compiled code. The method further includes communicating the compiled code from the server to the client via the network, at 714. The method ends, at 716.

Figure 8:
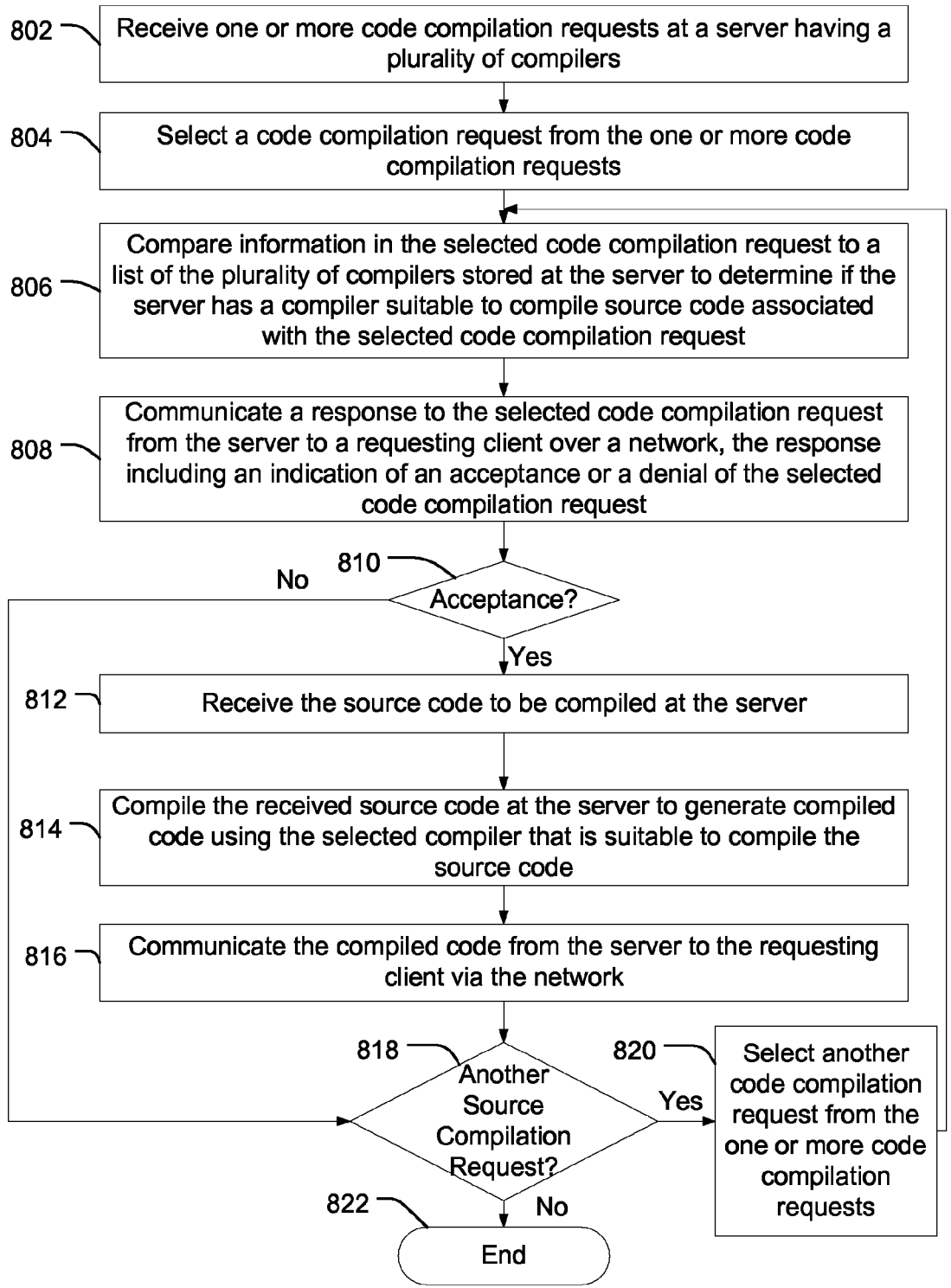
FIG. 8 is a flow diagram of a second particular illustrative embodiment of a method of performing server-based compilation.

FIG. 8 is a flow diagram that illustrates a second particular illustrative embodiment of a method of performing server-based compilation. At 802, the method includes receiving one or more code compilation requests at a server having a plurality of compilers. Advancing to 804, logic associated with the server selects a code compilation request from the one or more code compilations requests. Continuing to 806, the logic compares information in the selected code compilation request to a list of the plurality of compilers stored at the server to determine if the server has a compiler suitable to compiler source code associated with the selected code compilation request. Moving to 808, the logic communicates a response to the selected code compilation request from the server to a requesting client over a network, the response including an indication of an acceptance or a denial of the selected compilation request.

At decision node 810, when the response indicates an acceptance, the method advances to 812 and the source code to be compiled is received at the server. Continuing to 814, the method includes compiling the received source code at the server to generate compiled code using the selected compiler that is suitable to compile the source code. Advancing to 816, the method includes communicating the compiled code from the server to the requesting client via the network. Continuing to decision node 818, if there is another source compilation request, the method proceeds to 820 and selects another code compilation request (i.e., a second code compilation request) from the one or more code compilation requests. The method proceeds to 806 and compares information in the selected code compilation request to a list of the plurality of compilers stored at the server to determine if the server has a compiler suitable to compile source code associated with the selected code compilation request.

Returning to 810, if the response indicates a denial, the method advances to the decision node 818, where the method determines whether there is another source compilation request. If there is another source compilation request, the method proceeds to 820. At 818, if there is no other source compilation request, the method terminates at 822.

In a particular embodiment, the information in the code compilation request includes a source code language name, a source code language version, a processing device name, a processing device version, a driver name, a driver version, an operating system name, an operating system version, or any combination thereof. The information in the code compilation request includes information that may be used by the server to identify and select a particular compiler from the compiler library where the selected compiler is suitable and matches the code to be executed on the client. Such information may include information about a particular processing device, such as a particular graphics processing device, that is made available by a processing device vendor. In addition, the vendor of the processing device may provide the compiler that is stored on the server, such that the server can receive the vendor provided information from the client and can match the received information to previously stored information in the compiler library to select the appropriate compiler for use. The method may be used for multiple clients from multiple devices and the use of first and second clients is for illustrative purposes.

In a particular embodiment, the client is an application program, an installer program, or a device driver. In addition, the client may be loaded or otherwise disposed on a client device that includes a processor. In another particular embodiment, the source code may include a shading language such as OpenGL shading language, OpenGL vertex program, OpenGL fragment program, OpenGL ES shading language, nVidia Cg programming language, Microsoft DirectX High Level Shading Language, or another shading language, and the server-based compiler that is selected for use is a shader compiler. The source code may include a shading program, such as Open GL glFx, Microsoft Effect, or nVidia Effect CgFX that may be used in conjunction with a gaming application. The shader compiler at the server may be used to compile the source code for the shading program to generate compiled code that may be communicated and then executed at a client, such as a target portable device or an end user computer that includes a graphics processing unit.

In a particular embodiment, the server includes sufficient computing power and the communication interface has sufficient bandwidth such that the compilation of the source code is performed on a real-time or near real-time basis in response to the compilation code request.

Figure 9:
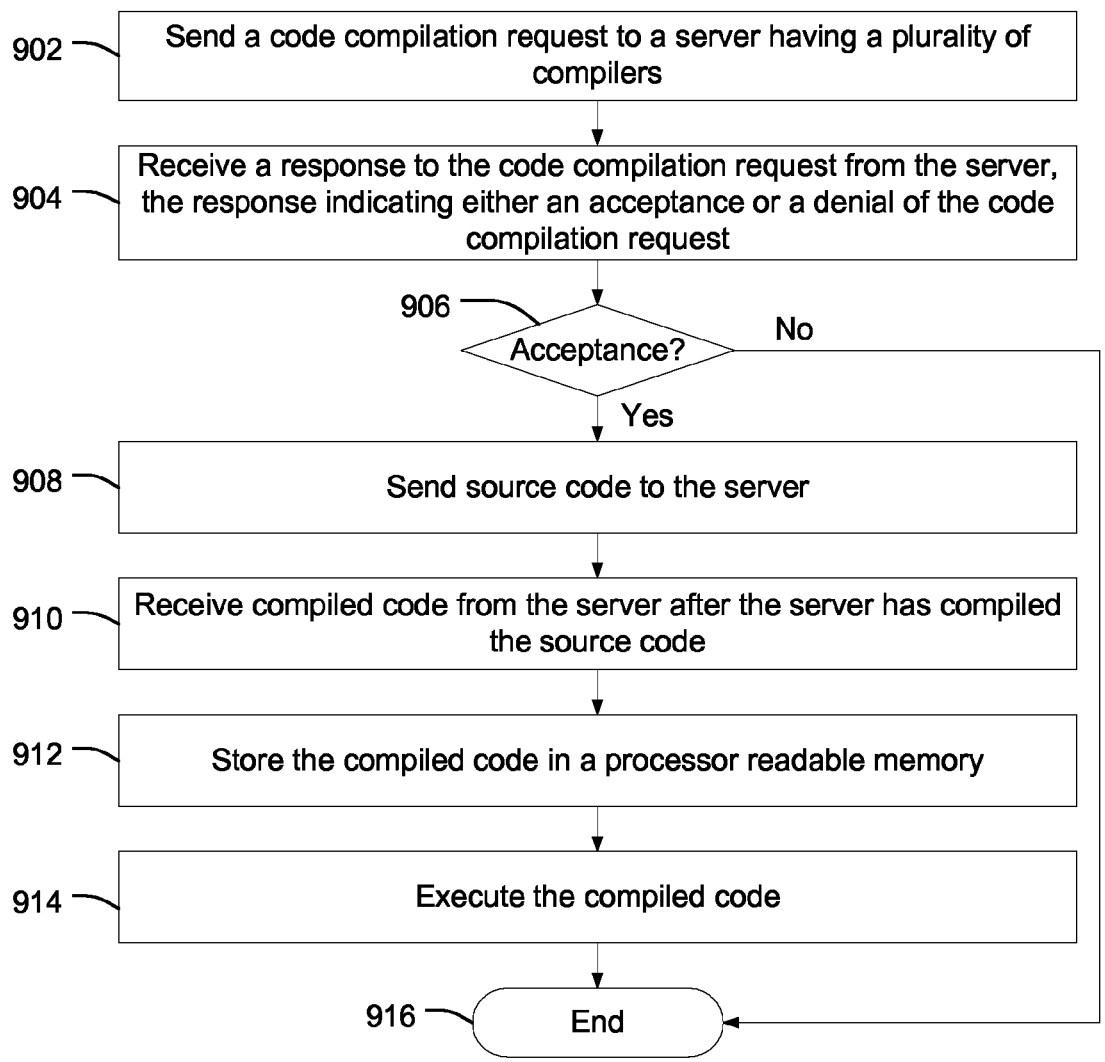
FIG. 9 is a flow diagram of a particular illustrative embodiment of a method of client requested compilation.

FIG. 9 is a flow diagram that illustrates a method of client requested compilation. Referring to FIG. 9, the method of requesting server-based code compilation includes sending a code compilation request to a server having a plurality of compilers, at 902, and receiving a response to the code compilation request from the server, the response indicating either an acceptance or a denial of the code compilation request, at 904. If a denial of the code compilation request is detected, at decision node 906, the method terminates at 916. Otherwise, upon detecting an acceptance of the code compilation request, at decision node 906, the method includes sending source code to the server, at 908, and receiving compiled code from the server after the server has compiled the source code, at 910. The method further includes storing the compiled code in a processor readable memory, at 912, and executing the compiled code, at 914. In a particular embodiment, the compiled code may be executed at an application processing unit, such as a GPU. In another embodiment, the compiled code may be executed at a digital signal processor (DSP) or a central processing unit (CPU). The method terminates at 916. In a particular embodiment, the source code is shader program code and the compiled code includes shader object code.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of requesting server-based code compilation, the method comprising:
sending, by a driver running on a central processing unit (CPU) of a client, a code compilation request to a server having a plurality of compilers, the client including a graphics processing unit (GPU), wherein the server is configured to compile shader programs that render graphics effects and that calculate a color associated with a graphical element;
receiving a response to the code compilation request from the server, the response indicating that the server can compile shader program code associated with the code compilation request;
upon detecting that the response indicates that the server can compile the shader program code, sending the shader program code to the server;
loading, by the GPU, vertex and texture shading data while waiting for shader object code from the server, the shader object code being a compiled version of the shader program code;
receiving the shader object code from the server;
providing the shader object code to the GPU after receiving the shader object code from the server; and
executing the shader object code at the GPU.

2. The method of claim 1, further comprising storing the shader object code in a processor readable memory.

3. The method of claim 1, further comprising:
generating, by the driver, requests to compile code into machine code executable by specific application processing units for specific components of the client; and
distributing compiled codes received from the server for execution on corresponding ones of the application processing units.

4. A computing device comprising:
a central processing unit (CPU);
a graphics processing unit (GPU);
a communication interface; and
a memory accessible to the CPU that stores instructions that, when executed by the CPU, cause the computing device to provide a driver that:
sends a code compilation request associated with shader program code to a server via the communication interface, the server having a plurality of compilers, wherein the server is configured to compile shader programs that render graphics effects and that calculate a color associated with a graphical element;
receives a response to the code compilation request from the server, the response indicating that the server can compile the shader program code;
sends the shader program code to the server upon determining that the response indicates that the server can compile the shader program code;
receives shader object code from the server, the shader object code being a compiled version of the shader program code; and
provides the shader object code to the GPU after receiving the shader object code from the server; and
wherein the GPU is configured to:
load vertex and texture shading data while waiting for the shader object code; and
execute the shader object code.

5. The computing device of claim 4, wherein the shader object code received from the server is stored in the memory and is executed by the GPU.

6. The computing device of claim 4, wherein the memory includes an application program that includes multiple layers, the layers including an application layer having code based on one or more application programming interfaces, and an application processing layer that is executed on an application processing unit.

7. The computing device of claim 4, wherein a compiler that is associated with the GPU and that is stored at the server is made available by a vendor of the GPU.

8. The computing device of claim 4, further comprising a file system stored in the memory.

9. The computing device of claim 4, further comprising a display device responsive to the GPU to display graphics and data.

10. The computing device of claim 4, further comprising:
a microphone adapted to receive audio input; and
a speaker adapted to produce an audio output.

11. The computing device of claim 4, wherein the driver:
generates requests to compile code into machine code executable by specific application processing units for specific components of the computing device; and
distributes compiled codes received from the server for execution on corresponding ones of the application processing units.

* * * * *